(12) United States Patent
Hanes (10) Patent No.: US 8,527,731 B2
(45) Date of Patent: Sep. 3, 2013

(54) ADAPTABLE EXTERNAL DRIVE

(75) Inventor: David H. Hanes, Fort Collins, CO (US)

(73) Assignee: Hewlett-Packard Development Company, LP., Houston, TX (US)

( * ) Notice: Subject to any disclaimer, the term of this patent is extended or adjusted under 35 U.S.C. 154(b) by 355 days.

(21) Appl. No.: 13/002,609

(22) PCT Filed: Jul. 8, 2008

(86) PCT No.: PCT/US2008/069436
§ 371 (c)(1),
(2), (4) Date: Jan. 4, 2011

(87) PCT Pub. No.: WO2010/005430
PCT Pub. Date: Jan. 14, 2010

(65) Prior Publication Data
US 2011/0107040 A1    May 5, 2011

(51) Int. Cl.
*G06F 12/00* (2006.01)

(52) U.S. Cl.
USPC .......................................... 711/173; 711/154

(58) Field of Classification Search
None
See application file for complete search history.

(56) References Cited

U.S. PATENT DOCUMENTS

| | | | | |
|---|---|---|---|---|
| 6,138,179 | A  * | 10/2000 | Chrabaszcz et al. | 710/10 |
| 7,395,402 | B2 * | 7/2008 | Wilson et al. | 711/173 |
| 2008/0155208 | A1* | 6/2008 | Hiltgen et al. | 711/154 |
| 2008/0155223 | A1* | 6/2008 | Hiltgen et al. | 711/173 |
| 2010/0262762 | A1* | 10/2010 | Borchers et al. | 711/103 |

* cited by examiner

*Primary Examiner* — Than Nguyen (57) ABSTRACT

In one embodiment a network attached storage device comprises a detection module to detect, in the network attached storage device, the connection of an external storage media to the network attached storage device, a format module to initiate, in the network attached storage device, a format utility, and configure the external storage media with at least a primary partition and a secondary partition.

16 Claims, 5 Drawing Sheets

ADAPTABLE EXTERNAL DRIVE

BACKGROUND

Various computer-based electronic devices utilize different operating systems to manage operations of the electronic devices. The different operating systems, in turn, may invoke different file systems to manage storage space. For example, Linux-based operating systems frequently utilize a file system referred to as an "ext3" file system. Other operating systems, such as for example some Windows®-based operating system, do not recognize the ext3 file system. Therefore, drives which are formatted by an ext3 file system are not accessible to the Windows®-based operating system.

The term Network Attached Storage (NAS) refers to a dedicated data storage device(s) connected directly to a computer network to provide centralized data access and storage services to one or more network clients such as, e.g., a personal computer. Some NAS devices provide the ability to back-up data on the NAS device to an external drive. When a NAS device which utilizes a particular operating system, for example a Linux-based operating system, is used to format an external drive, the external drive may not be readable by a computing device that uses a different operating system, for example a windows-based operating system.

DETAILED DESCRIPTION

Described herein are exemplary systems and methods to implement an adaptable external drive in network attached storage. The methods described herein may be embodied as logic instructions stored on a computer-readable storage medium. When executed on a processor, the logic instructions may cause a general processor to be programmed as a special-purpose machine that implements the described methods. The processor, when configured by the logic instructions to execute the methods recited herein, constitutes structure for performing the described methods.

Figure 1:
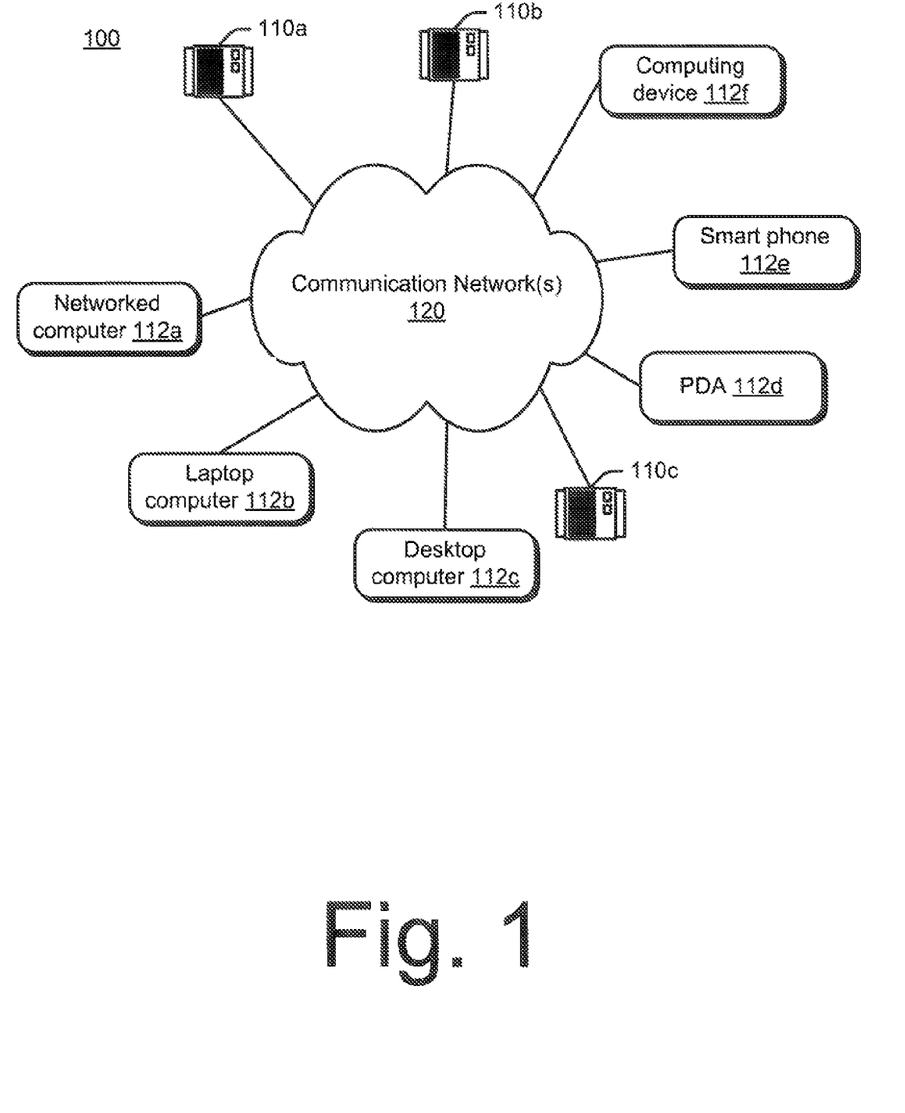
FIG. 1 is a schematic illustration of one embodiment of network attached storage environment.

FIG. 1 is a schematic illustration of one embodiment of network attached storage environment. Environment 100 may comprise one or more network attached storage devices 110a, 110b, 110c connected to one or more network clients 112a, 112b, 112c, 112d, 112e, 112f by a communication network 120.

Network attached storage devices 110a, 110b, 110c may be implemented as one or more communicatively connected storage devices. Exemplary storage devices may comprise, but are not limited to, the Media Vault™ line of storage devices commercially available form Hewlett-Packard Corporation of Palo Alto, Calif., USA. In some embodiments, at least a portion of communication network 120 may be implemented as a private, dedicated network such as, e.g., a local area network (LAN) or a wide area network (WAN). Alternatively, portions of communication network 120 may be implemented using public communication networks such as, e.g., the Internet, pursuant to a suitable communication protocol such as, e.g. TCP/IP.

Network clients 112a, 112b, 112c, 112d, 112e, 112f may be implemented as computing devices such as, e.g., a networked computer 112a, a laptop computer 112b, a desktop computer 112c, a personal digital assistant (PDA) 112d, a smart phone 112e, other computing devices 112f or the like. Applications running on network clients 112a, 112b, 112c, 112d, 112e, 112f may initiate file access requests to access information stored in network attached storage devices 110a, 110b, 110c. Network attached storage devices 110a, 110b, 110c receive file access requests and, in response, locate and return the requested information to the network client that originated the request.

Figure 2:
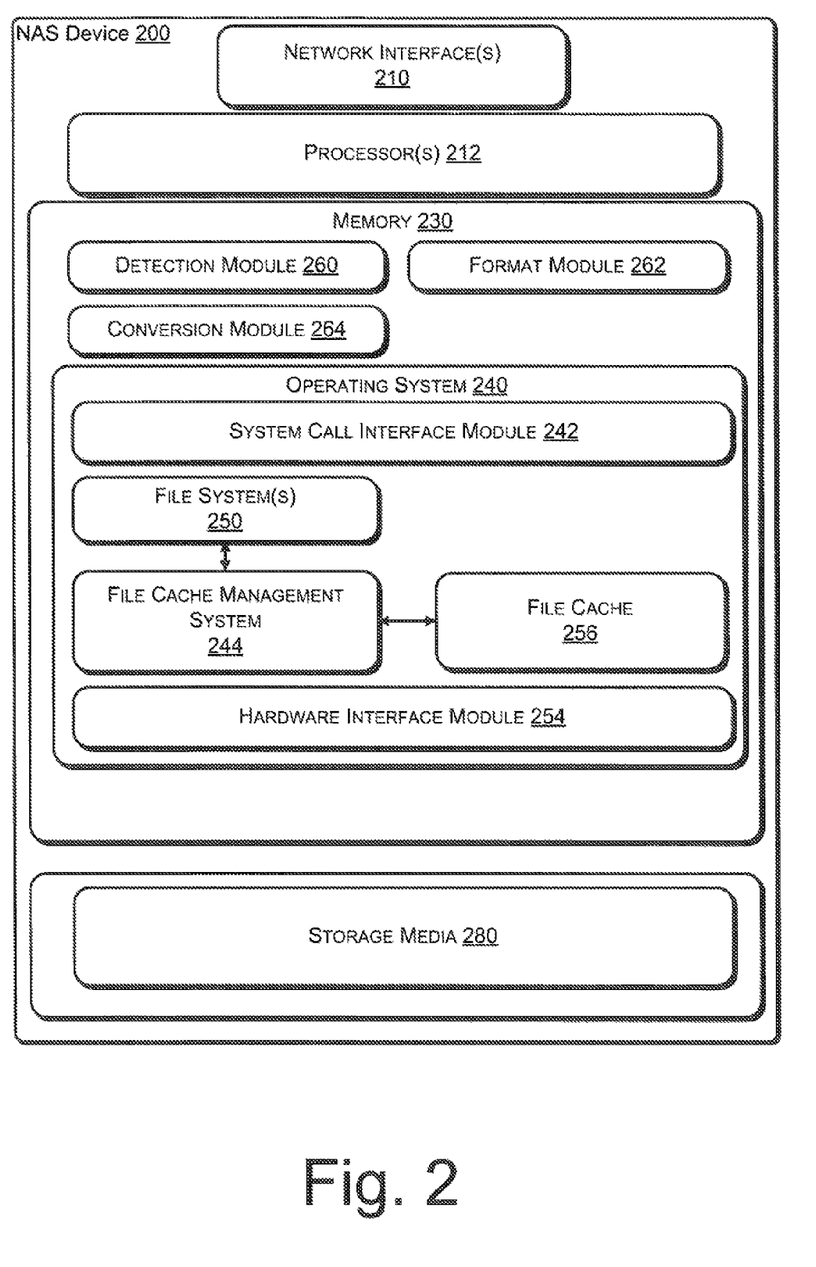
FIG. 2 is a schematic illustration of a network attached storage device, according to embodiments.

FIG. 2 is a schematic illustration of one embodiment of a network attached storage (NAS) device 200, which may be used to implement one or more of network attached storage devices 110a, 110b, 110c depicted in FIG. 1. Referring to FIG. 2, network storage device 200 comprises one or more network interfaces 210 which enables a communication connection with a network such as, e.g., network 120.

Network interface 210 may comprise an input/output (I/O) port to provide a physical connection with a network. For example, network interface 210 may comprise an Ethernet port. Network interface 210 may comprise a network interface card (NIC), also commonly referred to as a network adapter or a network card. The NIC manages I/O operations to enable NAS device 200 to communicate over a network. Alternatively, the operations of the NIC may be implemented on a main circuit board such as, e.g., a motherboard of NAS device 200.

NAS device 200 further comprises at least one processor 212. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit.

NAS device 200 further comprises system random access memory and/or read-only memory 230. Memory 230 comprises an operating system 240 for managing operations of NAS device 200. In one embodiment, operating system 240 comprises a hardware interface module 254 that provides an interface to system hardware. The particular embodiment of operating system 240 is not critical to the subject matter described herein. Operating system 240 may be embodied as a UNIX operating system or any derivative thereof (e.g., Linux, Solaris, etc.) or as a Windows® brand operating system.

Operating system 240 comprises (or interfaces with) a file system(s) 250 that manages files used in the operation of NAS device 200. For example, file system(s) 250 may implement one or more file systems such as FAT, NTFS, ext3, reiser, or the like. In one embodiment, operating system 240 may comprise a file cache management system 244 interposed logically between the file system(s) 250 and underlying modules such as, e.g., the hardware interface module 254. File cache management system 244 interfaces with the file system(s) 250 to manage the file cache 256 as a resource that may be shared between users of the computer system, e.g., on a per-workload basis.

Operating system 240 further comprises a system call interface module 242 that provides an interface between the operating system 240 and one or more application modules that execute on NAS device 200.

NAS device 200 further comprises storage media 280. For example, storage media 280 may be embodied as one or more arrays of magnetic disk drives, solid state drives or the like. Alternatively, storage media 280 may comprise optical, magneto-optical, or electro-optical storage media. Storage media 280 may be configured to implement RAID redundancy.

In some embodiments, NAS device 200 further comprises one or more software modules which enable the NAS device 200 to implement an adaptable external drive. In one embodiment, the NAS device 200 comprises a detection module 260, a format module 262, and a conversion module 264, each of which may be embodied as a software module that executes on processor(s) 212. Operations implemented by some embodiments of detection module 260 and format module 262 are described with reference to FIG. 3.

Figure 3:
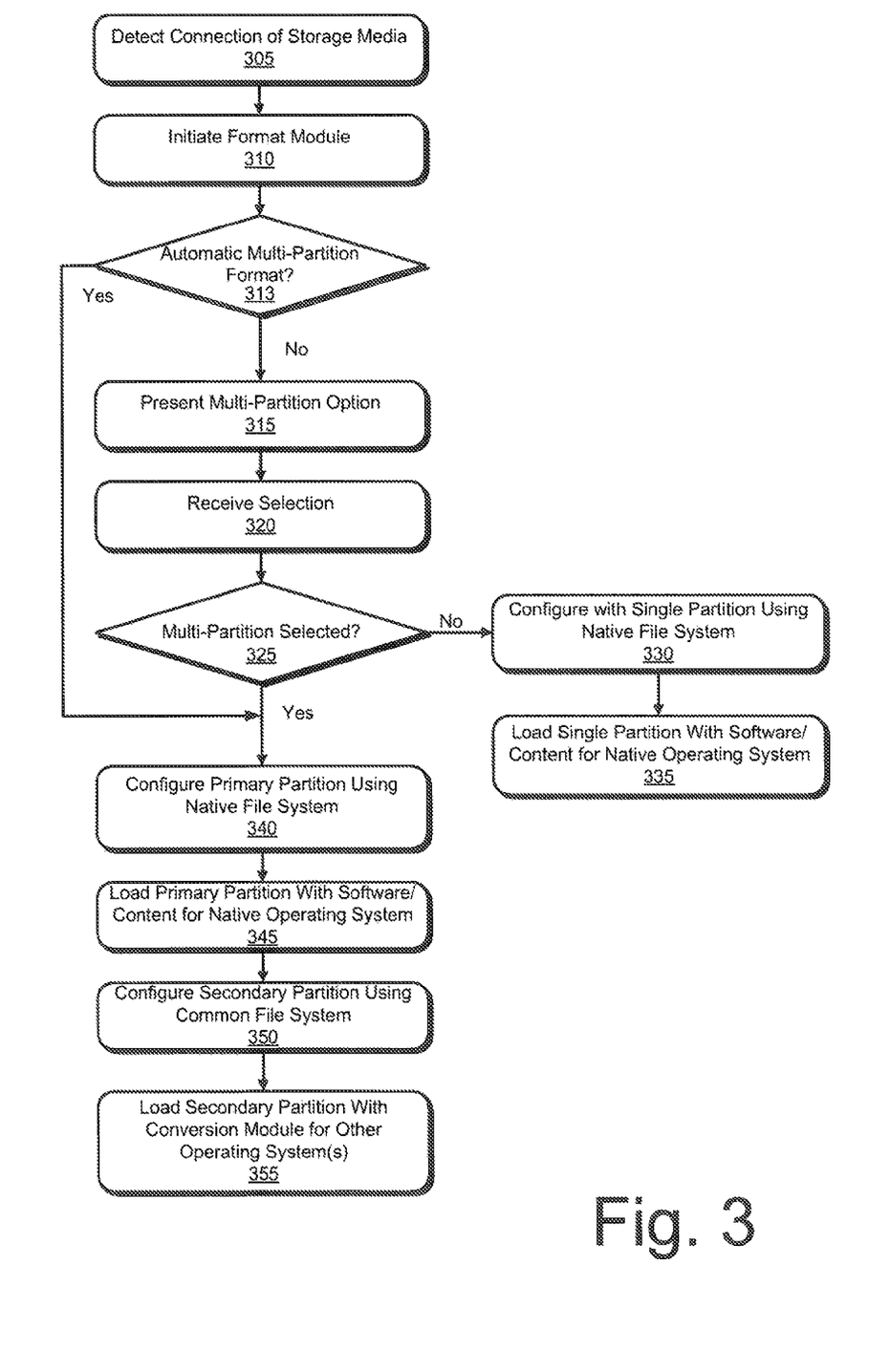
FIG. 3 is a flowchart illustrating operations in one embodiment of a method to implement an adaptable external drive in network attached storage device.

FIG. 3 is a flowchart illustrating operations in one embodiment of a method to implement an adaptable external drive in a network attached storage device 200. Referring to FIG. 3, at operation 305, a network attached storage device 200 may detect the connection of an external storage media such as, e.g., an external drive, to the network attached storage device 200. In some embodiments, detecting the connection of an external storage media may comprise detecting the connection of a storage media to a universal serial bus (USB) port on the network storage device. For example, in situations in which the external storage drive is plug-n-play (PnP) compatible, a USB controller on the network attached storage device may generate an interrupt in response to the connection of the external storage media. In alternate embodiments the network attached storage device may implement a polling routine to poll its USB ports for new connections.

At operation 310, a network attached storage device 200 may initiate a formatting module in response to the detection of the connection of a storage media 280. In some embodiments, the network attached storage device 200 may be constructed to implement an automatic multi-partition formatting option. If, at operation 313, the network attached storage device 200 is configured to implement an automatic multi-partition option, then control passes to operation 340. By contrast, if at operation 313 the network attached storage device 200 is not configured to implement an automatic multi-partition formatting option, then control passes to operation 315.

At operation 315 the format module presents a multi-partition option on a user interface coupled to the network attached storage device 200. For example, in some embodiments the format module may present an option for a user to implement multiple partitions on the storage media via a user interface on a computing device coupled to the network attached storage device 200, or on a display device coupled directly to the network attached storage device. At operation 320 a selection is received from the user interface.

If at operation 325, the selection indicates that the storage media 280 is not to be formatted with multiple partitions, then control passes to operation 330 and the storage media 280 is configured with a single partition using the file system native to the network attached storage device 200. Subsequently, at operation 335, the storage media 280 may be loaded with software or content formatted for the file system native to the network attached storage device 200.

By contrast, if at operation 325 the selection indicates that the storage media 280 is to be formatted with multiple partitions, then control passes to operation 340 and the storage media 280 is configured with a primary partition using the file system native to the network attached storage device 200. Subsequently, at operation 345, the storage media 280 may be loaded with software or content formatted for the file system native to the network attached storage device 200.

At operation 350 the storage media 280 is configured with a secondary partition using a common file system, which may or may not be native to the network attached storage device 200. For example, in one embodiment the secondary partition may be configured using a FAT (File Allocation Table) file system such as FAT32, or the like. Subsequently, at operation 355, secondary partition is loaded with a conversion module comprising software to convert files from a format compatible with the file system native to the network attached storage device 200 to the common file system. In some embodiments, the common file system may comprise software to convert from a first format to a second format. In some embodiments, the common file system may interface a computing system to a native file system. By way of example and not limitation, a NAS device 200 may be formatted with ext3 file system, and a common partition could include Windows file system drivers that may allow Windows to read and write with an ext3 file system. One skilled in the art will recognize that additional partitions may be implemented and loaded with additional conversion modules.

Thus, the operations depicted in FIG. 3 enable a network storage device 200 to format an external drive into multiple partitions and to load software to convert files on the external drive from a format native to the file system of the network attached storage device 200 into a common format. In some embodiments, a computing device coupled to the network attached storage device 200 may be configured to cooperate with the network attached storage device 200 to enable files stored on the network attached storage device 200 and formatted by the file system native to the network attached storage device 200 to be accessed by the computing device, even if the computing device uses a different file system.

Figure 4:
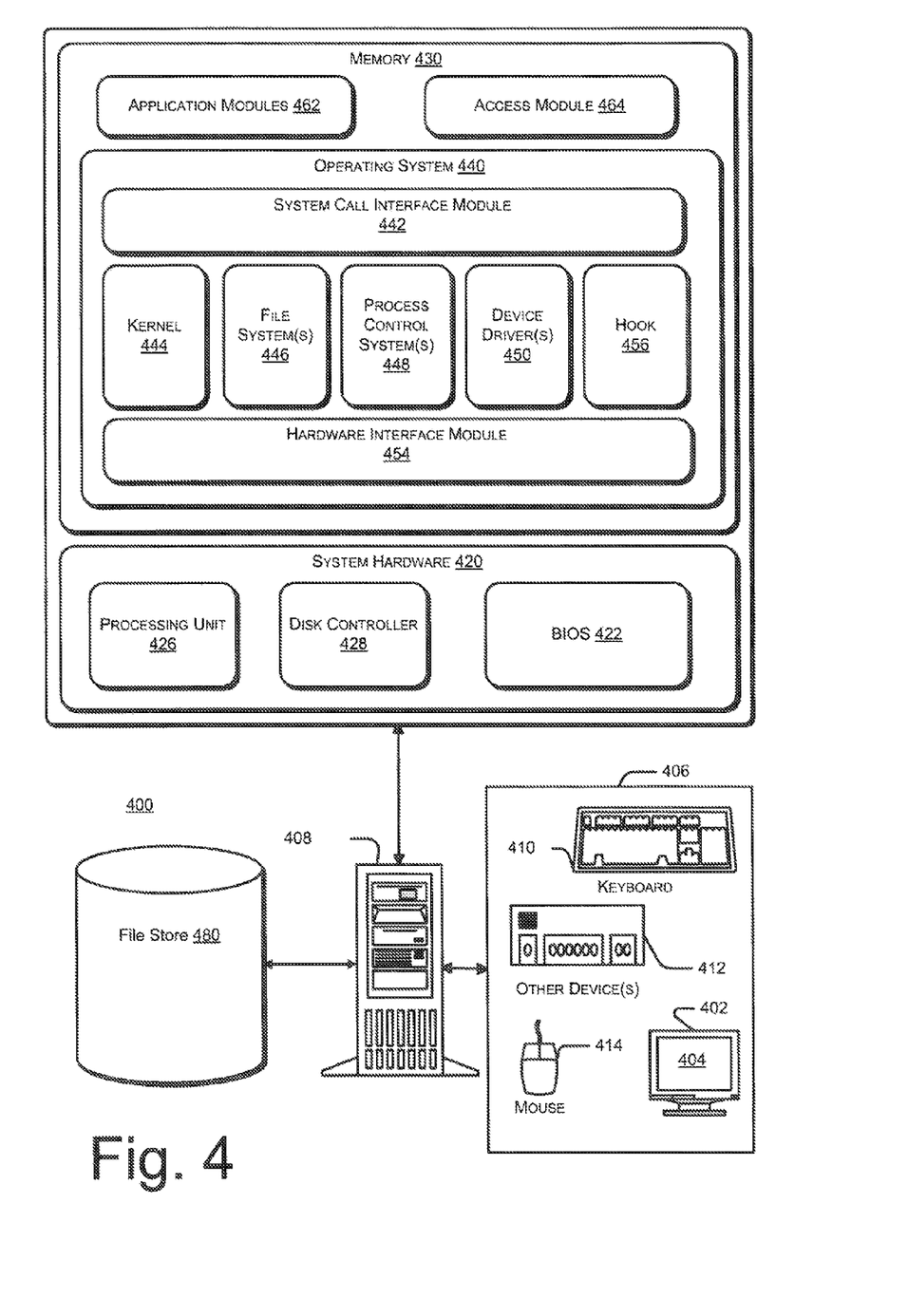
FIG. 4 is a schematic illustration of an exemplary computing device, according to embodiments.

FIG. 4 is a schematic illustration of an exemplary computing, according to embodiments. Referring to FIG. 4, in some embodiments computing system 400 may be embodied as a hand-held or stationary device for accessing the Internet, a desktop PCs, notebook computer, personal digital assistant, or any other processing devices that have a basic input/output system (BIOS) or equivalent.

The computing system 400 includes a computer 408 and one or more accompanying input/output devices 406, which may include a display 402 having a screen 404, a keyboard 410, other I/O device(s) 412, and a mouse 414. The other device(s) 412 may include, for example, a touch screen, a voice-activated input device, a track ball, and any other device that allows the system 400 to receive input from a developer and/or a user. The computer 408 includes system hardware 420 including a processing unit 426, a disk controller 428, and random access memory and/or read-only memory 430.

A file store 480 is communicatively connected to computer 408. File store 480 may be internal such as, e.g., one or more hard drives, or external such as, e.g., one or more external hard drives, network attached storage, or a separate storage network.

Memory 430 includes an operating system 440 for managing operations of computer 408. In one embodiment, operating system 440 includes a hardware interface module 454 that provides an interface to system hardware 420. In addition, operating system 440 includes a kernel 444, one or more file systems 446 that manage files used in the operation of computer 408 and a process control subsystem 448 that manages processes executing on computer 408. Operating system 440 further includes one or more device drivers 450 and a system call interface module 442 that provides an interface between the operating system 440 and one or more application modules 462. The various device drivers 450 interface with and generally control the hardware installed in the computing system 400.

In operation, one or more application modules 462 executing on computer 408 make calls to the system call interface module 442 to execute one or more commands on the computer's processor. The system call interface module 442 invokes the services of the file systems 446 to manage the files required by the command(s) and the process control subsystem 448 to manage the process required by the command(s). The file system(s) 446 and the process control subsystem 448, in turn, invoke the services of the hardware interface module 454 to interface with the system hardware 420. The operating system kernel 444 can be generally considered as one or more software modules that are responsible for performing many operating system functions.

The technology of this disclosure can accommodate various embodiments of operating systems Operating system 440 may be embodied as a UNIX operating system or any derivative thereof (e.g., Linux, Solaris, etc.), a Windows® brand operating system, or any other operating system.

Computing system 400 further includes a basic input/output system (BIOS) 422. In one embodiment, BIOS 422 may be implemented in flash memory and may comprise a power-on self-test (POST) module for performing system initialization and tests. In operation, when activation of computing system 400 begins processing unit 426 accesses BIOS 422 and shadows the instructions of BIOS 422, such as power-on self-test module, into operating memory. Processor 426 then executes power-on self-test operations to implement POST processing.

Figure 5:
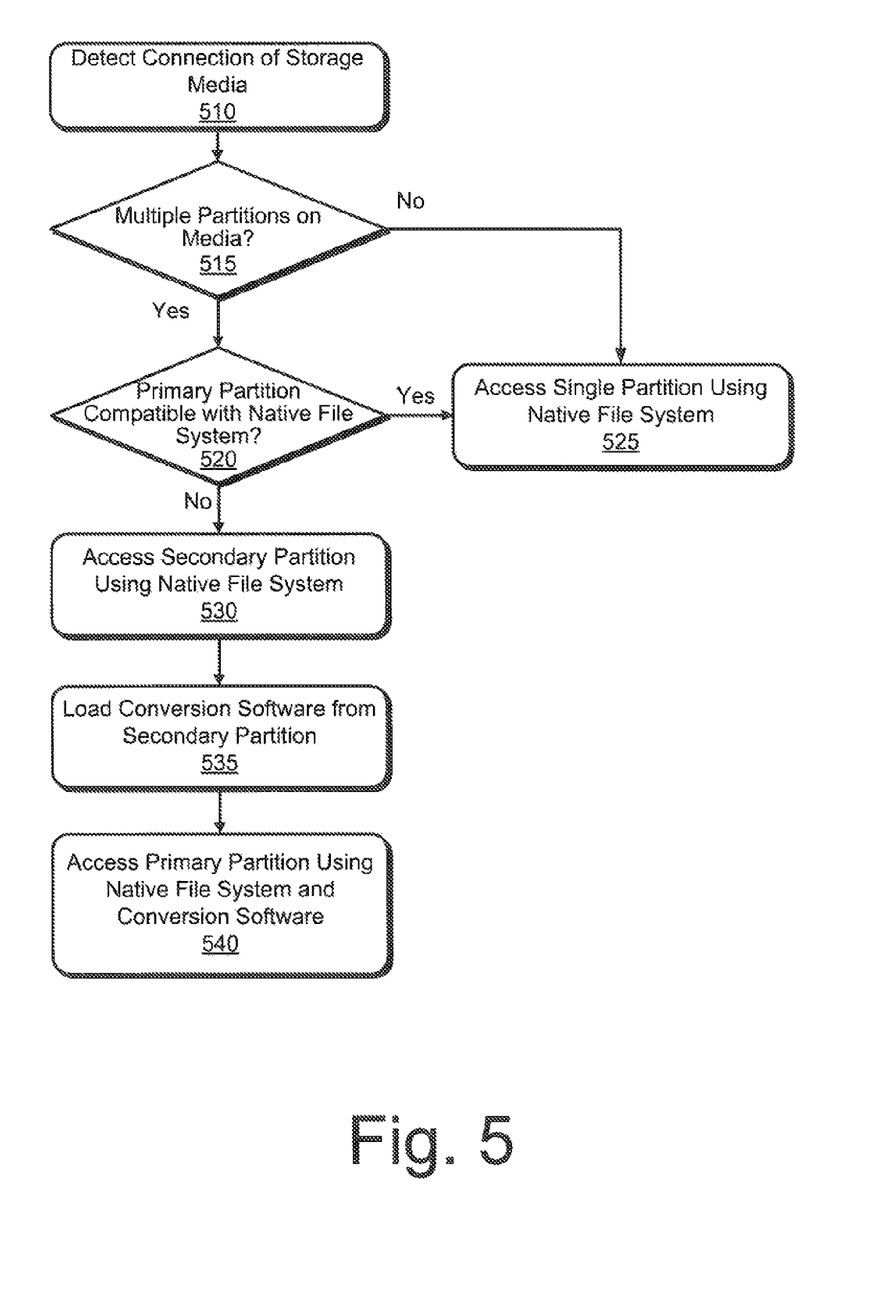
FIG. 5 is a flowchart illustrating operations in one embodiment of a method to implement an adaptable external drive in computing device.

In some embodiments, computer system 400 includes an access module 464 adapted to cooperate with the network attached storage device to enable files stored on the network attached storage device and formatted by the file system native to the network attached storage device to be accessed by the computing device, even if the computing device uses a different file system. In some embodiments, access module 464 may be implemented as a file system, such as file system 446. FIG. 5 is a flowchart illustrating operations in one embodiment of a method to accommodate an adaptable external drive in computing device. The operations depicted in FIG. 5 may be embodied as logic instructions on a computer-readable medium which may be loaded into the operating memory of the computer system and executed by the processing unit 426. In one embodiment the logic instructions may be encoded at the application layer of the computer system. In alternate embodiments the logic instructions may be encoded at the kernel layer of the operating system 440, or in the file system(s) 446.

Referring to FIG. 5, at operation 510 the connection of the storage media such as the external connection of an external storage media such as, e.g., an external drive, to computer system 400 is detected. In some embodiments, detecting the connection of an external storage media may comprise detecting the connection of a storage media to a universal serial bus (USB) port, an IEEE 1394 port, an eSATA bus port or the like on the computer system 400. For example, in situations in which the external storage drive is plug-n-play (PnP) compatible, a USB controller on the computer system 400 may generate an interrupt in response to the connection of the external storage media. In alternate embodiments the computer system 400 may implement a polling routine to poll its USB ports for new connections.

If, at operation 515, the external drive does not have multiple partitions, then control passes to operation 525 and the computer system 400 accesses the single partition on the external drive using the file system native to the computer system 400. By contrast, if at operation 515 there are multiple partitions on the external drive then control passes to operation 520.

If, at operation 520, the primary partition is compatible with file system native to the computer system 400, then control passes to operation 525 and the computer system 400 accesses the single partition on the external drive using the file system native to the computer system 400. By contrast, if at operation 520, the primary partition is not compatible with file system native to the computer system 400, then control passes to operation 530 and the computer system 400 accesses the secondary partition on the external drive using the file system native to the computer system 400. At operation 535 the computer system 400 loads the conversion software from the secondary partition, and at operation 540 the computer system 400 accesses the primary partition using the file system native to the computer system 400 and the conversion software retrieved from the external drive.

Thus, the access module 464 enables the computer system 400 to invoke the conversion software placed in the secondary partition of the external drive in order to convert the files stored in the primary partition from a file format that is not recognized by the computer system 400 into a format that is recognized by the computer system 400.

Some embodiments of the methods described herein may be provided as computer program products, which may comprise a machine-readable or computer-readable medium having stored thereon instructions used to program a computer (or other electronic devices) to perform a process discussed herein. The machine-readable medium may comprise, but is not limited to, floppy diskettes, hard disk, optical disks, CD-ROMs, magneto-optical disks, ROMs, RAMs, erasable programmable ROMs (EPROMs), electrically erasable EPROMs (EEPROMs), magnetic or optical cards, flash memory, or other suitable types of media or computer-readable media suitable for storing electronic instructions and/or data. Moreover, data discussed herein may be stored in a single database, multiple databases, or otherwise in select forms (such as in a table).

Reference in the specification to "one embodiment" or "an embodiment" means that a particular feature, structure, or characteristic described in connection with the embodiment is comprised in at least an implementation. The appearances of the phrase "in one embodiment" in various places in the specification are not necessarily all referring to the same embodiment.

The foregoing description, for purposes of explanation, has been described with references to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical application, to thereby enable others skilled in the aft to best utilize the invention and various embodiments with various modifications as are suited to the particular use contemplated.

What is claimed is:

1. A method to configure an adaptable external drive from a network attached storage device, comprising:
   detecting, in the network attached storage device, the connection of an external storage media to the network attached storage device;
   initiating, in the network attached storage device, a format utility;

configuring the external storage media with at least a primary partition and a secondary partition;
coupling the external storage media to a computing device;
determining, in the computing device, whether the primary partition is compatible with a file system executing on the computing device; and
at least one of:
   in response to a determination that the primary partition is compatible with a file system executing on the computing device, accessing the primary partition using the file system executing on the computing device; or
   in response to a determination that the primary partition is incompatible with a file system executing on the computing device:
      loading a file format conversion module from the secondary partition; and
      accessing the primary partition using the file system executing on the computing device and the conversion module.

2. The method of claim 1, wherein, detecting, in the network attached storage device, the connection of an external storage media to the network attached storage device comprises detecting a connection via at least one of a universal serial bus (USB) port, an IEEE 1394 port, and an eSATA port.

3. The method of claim 1, further comprising:
presenting a multi-partition format option on a user interface coupled to the network attached storage device.

4. The method of claim 1, wherein configuring the external storage media with at least a primary partition and a secondary partition comprises:
configuring the primary partition using a first file system; and
configuring the secondary partition using a second file system.

5. The method of claim 4, further comprising loading the file format conversion module into the secondary partition.

6. A method comprising:
coupling an external storage media to a computing device, the external storage media having at least a primary partition and a secondary partition;
determining, in the computing device, whether the primary partition is compatible with a file system executing on the computing device; and
at least one of:
   in response to a determination that the primary partition is compatible with a file system executing on the computing device, accessing the primary partition using the file system executing on the computing device; or
   in response to a determination that the primary partition is incompatible with a file system executing on the computing device:
      loading a file format conversion module from the secondary partition; and
      accessing the primary partition using the file system executing on the computing device and the conversion module.

7. A computer program product comprising logic instructions stored on a computer-readable storage medium which, when executed by a processor in a network attached storage device, configure the processor to:
determine whether a primary partition of an external storage media is compatible with a file system executing on a computing device, the external storage media having at least the primary partition and a secondary partition; and
at least one of:
   in response to a determination that the primary partition is compatible with a file system executing on the computing device, access the primary partition using the file system executing on the computing device; or
   in response to a determination that the primary partition is incompatible with a file system executing on the computing device:
      load a file format conversion module from the secondary partition; and
      access the primary partition using the file system executing on the computing device and the conversion module.

8. The computer program product of claim 7, further comprising logic instructions stored on a computer-readable storage medium which, when executed by a processor, configure the processor to detect a connection of the external storage media to at least one of a universal serial bus (USB) port, an IEEE 1394 port, and an eSATA port.

9. The computer program product of claim 7, further comprising logic instructions stored on a computer-readable storage medium which, when executed by a computer processor, configure the processor to:
present a multi-partition format option on a user interface coupled to the network attached storage device.

10. The computer program product of claim 7, further comprising logic instructions stored on a computer-readable storage medium which, when executed by a computer processor, configure the processor to:
configure the first partition using a first file system; and
configure the second partition using a second file system.

11. The computer program product of claim 7, further comprising logic instructions stored on a computer-readable medium which, when executed by a computer processor, configure the processor to load a file format conversion module into the secondary partition.

12. A network attached storage device, comprising:
a detection module to detect, in the network attached storage device, the connection of an external storage media to the network attached storage device;
a format module to:
   initiate, in the network attached storage device, a format utility; and
   configure the external storage media with at least a primary partition and a secondary partition; and
a computing device coupled to the external storage media, wherein the computing device comprises an access module to:
   determine whether the primary partition is compatible with a file system executing on the computing device; and
   at least one of:
      in response to a determination that the primary partition is compatible with a file system executing on the computing device, to access primary partition using the file system executing on the computing device, or
      in response to a determination that the primary partition is incompatible with a file system executing on the computing device, to:
         load a file format conversion module from the secondary partition; and
         access the primary partition using the partition using the file system executing on the computing device and the file format conversion module.

13. The network attached storage device of claim 12, wherein the detection module is further configured detect a connection via at least one of a universal serial bus (USB) port, an IEEE 1394 port, and an eSATA port.

14. The network attached storage device of claim 12, wherein the format module is further configured to present a multi-partition format option on a user interface coupled to the network attached storage device.

15. The network attached storage device of claim 12, wherein the format module is further configured to:
   configure the primary partition using a first file system; and
   configure the secondary partition using a second file system.

16. The network attached storage device of claim 15, wherein the format module is configured to load the file format conversion module into the secondary partition.

* * * * *

UNITED STATES PATENT AND TRADEMARK OFFICE
CERTIFICATE OF CORRECTION

| | | |
|---|---|---|
| PATENT NO. | : 8,527,731 B2 | Page 1 of 1 |
| APPLICATION NO. | : 13/002609 | |
| DATED | : September 3, 2013 | |
| INVENTOR(S) | : David H. Hanes | |

It is certified that error appears in the above-identified patent and that said Letters Patent is hereby corrected as shown below:

In the Specifications

In column 1, line 64, delete "form" and insert --from--, therefor.

In the Claims

In column 8, line 67, in Claim 13, delete "detect" and insert --to detect--, therefor.

Signed and Sealed this
Twenty-fifth Day of March, 2014

Michelle K. Lee
*Deputy Director of the United States Patent and Trademark Office*